United States Patent
Ma et al.

(10) Patent No.: US 8,533,511 B2
(45) Date of Patent: Sep. 10, 2013

(54) NOTEBOOK COMPUTER

(75) Inventors: Mou-Ming Ma, Taipei Hsien (TW);
Rain-Ted Hwang, Taipei Hsien (TW);
Ying-Chun Tseng, Taipei Hsien (TW);
Yih-Neng Lin, Taipei Hsien (TW);
Chun-Kun Lan, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 728 days.

(21) Appl. No.: 12/471,593

(22) Filed: May 26, 2009

(65) Prior Publication Data

US 2010/0218021 A1    Aug. 26, 2010

(30) Foreign Application Priority Data

Feb. 24, 2009  (TW) ................................ 98201664 U

(51) Int. Cl.
*G06F 1/00*        (2006.01)

(52) U.S. Cl.
USPC .......................................... 713/340; 713/300

(58) Field of Classification Search
USPC ................................. 713/300, 340
See application file for complete search history.

(56) References Cited

U.S. PATENT DOCUMENTS

| 7,110,896 B2* | 9/2006 | Lamer et al. ..................... 702/63 |
| 7,463,163 B2* | 12/2008 | Wu ........................... 340/815.45 |
| 2005/0144495 A1* | 6/2005 | Nakajima et al. ............. 713/340 |
| 2006/0049695 A1* | 3/2006 | Tian et al. ..................... 307/150 |

FOREIGN PATENT DOCUMENTS

JP    2006059047 A   *   3/2006

OTHER PUBLICATIONS

Texas Instruments, Gas Gauge IC for Lithium Primary Cells, Preliminary bq2052, 2008.*

* cited by examiner

*Primary Examiner* — Kim Huynh
*Assistant Examiner* — Zahid Choudhury
(74) *Attorney, Agent, or Firm* — Chun-Ming Shih

(57) ABSTRACT

An exemplary notebook computer includes a smart battery, a number of status indicator lights, a function key and a control unit electrically coupled to the smart battery, the status indicator lights and the function key. In the condition that the notebook computer is situated either in a shutdown mode or in a power saving mode and the function key is pressed, the control unit reads the data of the remaining capacity of the smart battery through a bus between the smart battery and the control unit so as to calculate the remaining capacity of the smart battery. Thus, the control unit can control the status indicator lights to be light on/off to display the information of the remaining capacity of the smart battery.

15 Claims, 2 Drawing Sheets

NOTEBOOK COMPUTER

BACKGROUND

The present invention relates to a notebook computer, and particularly to a notebook computer that is capable of displaying the remaining capacity of the battery used by the notebook computer when the notebook computer is situated either in a shutdown mode or in a power saving mode (e.g., the display screen is closed).

With the development of the personal computer technology, the functions of a notebook computer are basically the same as a desktop computer and the volume of the notebook computer become smaller and smaller so as to be put into a suitcase or a backpack conveniently. Therefore, nowadays, carrying the notebook computer for either business or personal uses is popular. To achieve the portable function, the power supply of the notebook computer is mainly a portable battery. A simple method to know the remaining capacity of the battery is to directly read the information displayed by the operating system of the notebook computer in a normal operating mode (i.e., a power-on working status). For example, the user of the Microsoft Windows operating system can read the information of the remaining capacity of the battery in the notice area in the bottom right-hand corner of the operating system window. However, the information of the remaining capacity of the battery can not be read any more when the operating system of the notebook computer is situated either in a shutdown mode or in a power saving mode (i.e., an off-line status).

BRIEF SUMMARY

The present invention provides a notebook that is capable of displaying the remaining capacity of the battery when the notebook computer is situated either in a shutdown mode or in a power saving mode, The notebook computer of the present invention includes a smart battery, a number of status indicator lights, a function key and a control unit electrically coupled to the smart battery, the status indicator lights and the function key. In the condition that the notebook computer is situated either in a shutdown mode or in a power saving mode and the function key is pressed, the control unit reads the data of the remaining capacity of the smart battery through a bus between the smart battery and the control unit so as to calculate the remaining capacity of the smart battery. Thus, the control unit can control the status indicator lights to be light on/off to display the information of the remaining capacity of the smart battery.

In one preferred embodiment, the smart battery comprises a gas gauge IC for providing the data of the remaining capacity of the smart battery.

In one preferred embodiment, the control unit is an embedded controller.

In one preferred embodiment, the plurality of status indicator lights are LEDs, an anode of each of the LEDs is electrically coupled to a system voltage, and a cathode of each of the LEDs is electrically coupled to a corresponding lead of a general purpose input/output of the embedded controller.

In one preferred embodiment, the bus is a system management bus.

In one preferred embodiment, the function key is a power supply function key.

In one preferred embodiment, the function key is a left or a right key of a touch pad.

Therefore, the user can press the function key firstly, either the power supply function key or one of the left and right keys of the touch pad, when the notebook computer is situated either in a shutdown mode or in a power saving mode. Then, the embedded controller reads the data of the remaining capacity of the smart battery through the system management bus, thereby analyzing the remaining capacity of the smart battery.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
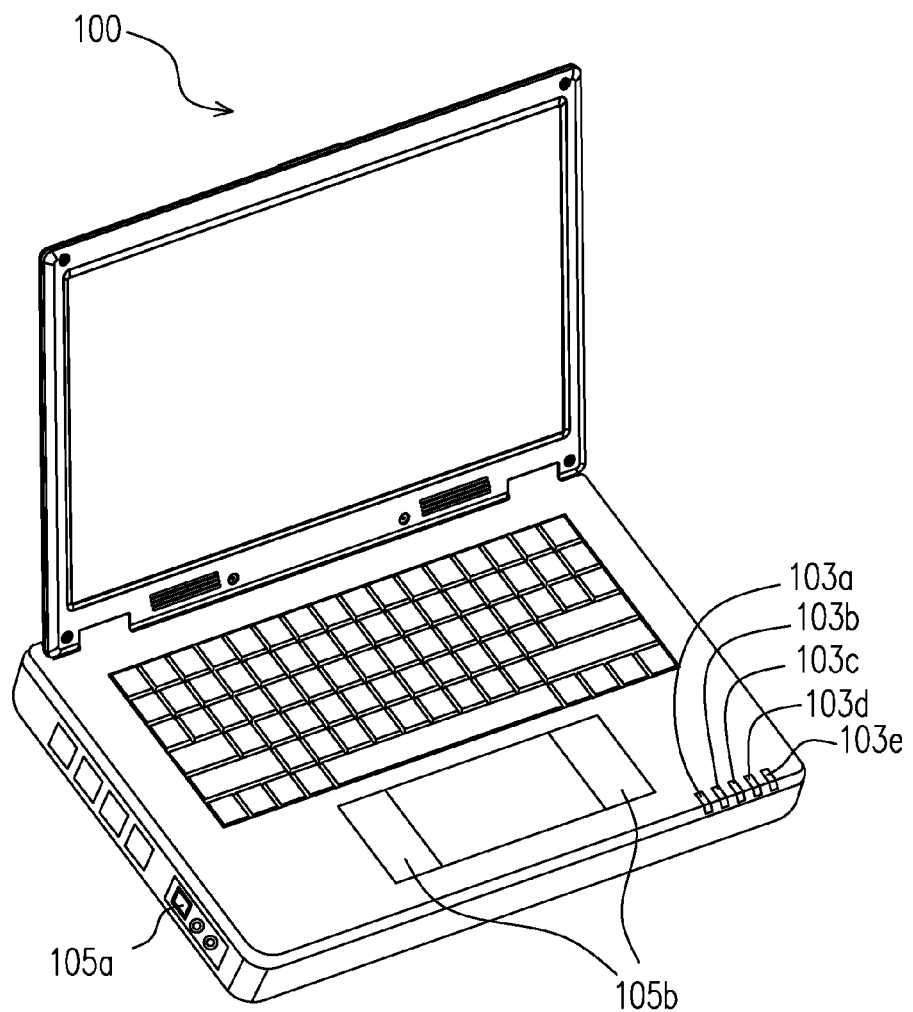
FIG. 1 is a schematic view of a notebook computer in accordance with the preferred embodiment of the present invention.
Figure 2:
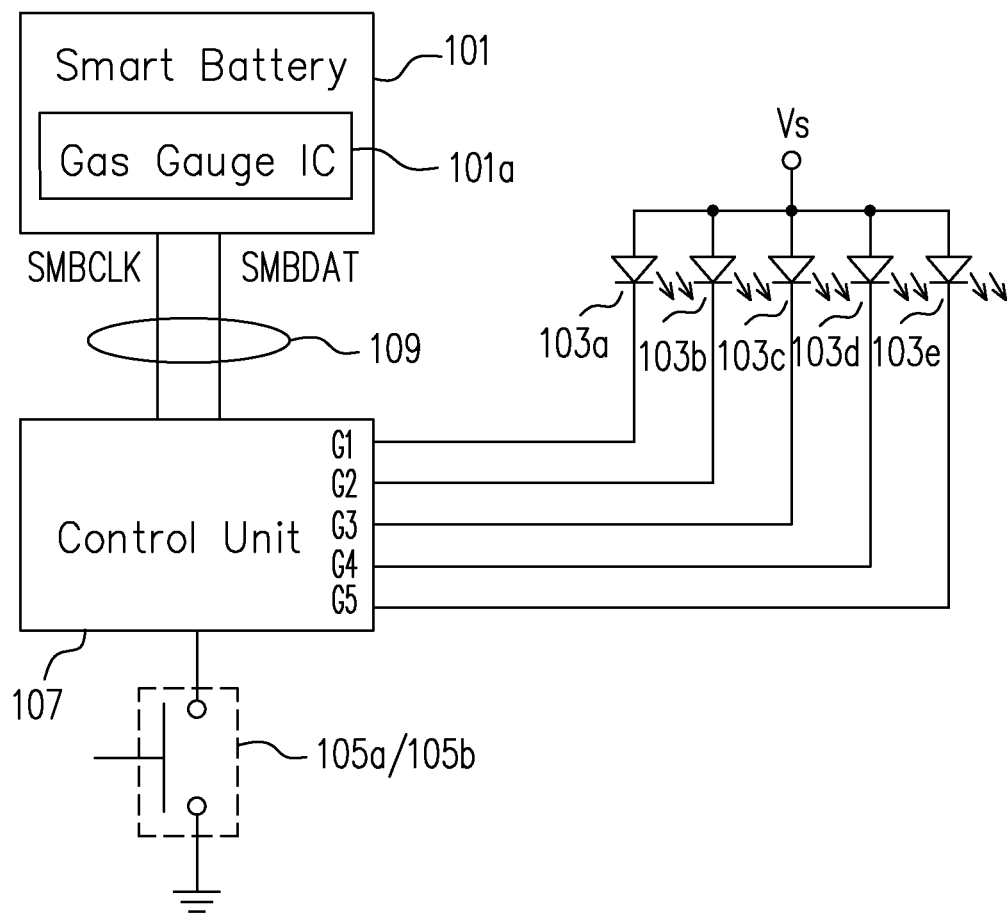
FIG. 2 is a block diagram of a partial system of the notebook computer shown in FIG. 1.

Referring to FIG. 1, a notebook computer 100 in accordance with the preferred embodiment of the present invention is shown. Referring to FIG. 2, a block diagram of a partial system of the notebook computer 100 shown in FIG. 1 is provided. Referring to FIG. 1 and FIG. 2, the notebook computer 100 includes a smart battery 101, a number of status indicator lights (e.g., in the present embodiment, the notebook computer 100 includes, but not limited to, five status indicator lights 103a~103e), a function key 105a/105b, and a control unit 107 electrically coupled to the smart battery 101, the status indicator lights 103a~103e, and the function key 105a/105b.

It is noted that the notebook computer 100 further includes other components such as a displaying module, a keyboard module, and so on. But in the present embodiment, only the associated components are shown for explaining the notebook computer 100.

The smart battery 101 includes a gas gauge IC 101a for providing the data of the remaining capacity of the smart battery 101. For example, the gas gauge IC 101a can measure the available charge of the smart battery 101, thereby obtaining the associated data of the remaining capacity of the smart battery 101. In the present embodiment, the control unit 107 is an embedded controller. Therefore, in the following description, the control unit 107 is also called the embedded controller 107. The embedded controller 107 includes a general purpose input/output (GPIO). In the present embodiment, the general purpose input/output includes five leads G1~G5 according to the number of the status indicator lights 103a~103e. The function key can be one of the various original function keys equipped in the notebook computer 100. For example, in the present embodiment, the function key 105a is, but not limited to, a power supply function key and the function key 105b is, but not limited to, one of the left and right keys of a touch pad.

In the present embodiment, all the status indicator lights 103a~103e are light-emitting diodes (LEDs). Therefore, in the following description, the status indicator lights 103a~103e are also called the LEDs 103a~103e. An anode of each of the LEDs 103a~103e is electrically coupled to a system voltage Vs (e.g., +3.3V). A cathodes of each of the LEDs 103a~103e is respectively electrically coupled to a corresponding lead of the general purpose input/output (GPIO) of the embedded controller 107. For example, the cathode of the LED 103a is electrically coupled to the lead G1, the cathode of the LED 103b is electrically coupled to the lead G2, the cathode of the LED 103c is electrically coupled to the lead G3, the cathode of the LED 103d is electrically coupled to the lead G4, and the cathode of the LED 103e is electrically coupled to the lead G5.

The LEDs 103a~103e are, but not limited to, equipped in a main body of the notebook computer 100 originally. In the present embodiment, the LEDs 103a~103e can be an indicator light group that includes, but not limited to, a power supply indicator light, a network indicator light, a bluetooth indicator light, a hard drive indicator light and a USB port indicator light.

When the operating system of the notebook computer 100 is situated in a normal operating mode (i.e., a power-on working status), the users can know the remaining capacity of the smart battery 101 by reading the information of the remaining capacity of the smart battery 101 in the notice area in the bottom right-hand corner of the operating system window directly.

When the operating system of the notebook computer 100 is situated either in a shutdown mode or in a power saving mode (i.e. an off-line status, the status of power saving modes S3~S5 defined by the advanced configuration and power management interface (ACPI)), the users can know the information of the remaining capacity of the smart battery 101 using the following method. At first, the function key is pressed. In the present embodiment, the user can press either the function key 105a (i.e., the power supply function key) or the function key 105b (i.e., one of the left and right keys of the touch pad). Then, the embedded controller 107 will obtain a low level trigger signal, thereby beginning to analyzing the remaining capacity of the smart battery 101.

When the embedded controller 107 is received the low level trigger signal, the embedded controller 107 reads the data of the remaining capacity of the smart battery 101 provided by the gas gauge IC 101a through a system management bus (SMBus or SMB) 109. The SMBus 109 is a simple two-wire bus including a system management bus clock frequency (SMBCLK) line and a system management bus data (SMBDATA) line. It is well known that the SMBus is derived from $I^2C$ and used for communication with low-bandwidth devices on a motherboard of a computer. Thus, the embedded controller 107 can calculate the remaining capacity of the smart battery 101 according to the read data.

The data of the remaining capacity of the smart battery 101 provided by the gas gauge IC 101a includes at least the total capacity of the smart battery 101 in the saturated charge condition and the remaining capacity of the smart battery 101. Thus, the embedded controller 107 can calculate the percentage of the remaining capacity of the smart battery 101 relative to the total capacity of the smart battery 101 in the saturated charge condition. That is, the remaining capacity of the smart battery 101 is divided by the total capacity of the smart battery 101 in the saturated charge condition so as to get the percentage.

If the percentage of the remaining capacity of the smart battery 101 relative to the total capacity of the smart battery 101 in the saturated charge condition is, but not limited to, less than 10%~30%, the embedded controller 107 will output a low level signal through the lead G1 of the general purpose input/output and simultaneously output a respective high level signal through the leads G2~G5 of the general purpose input/output. As a result, only the LED 103a is lighted on and the other LEDs 103b~103e are lighted off. The light state of the LEDs 103a~103e denotes the remaining capacity of the smart battery 101 is too little.

If the percentage of the remaining capacity of the smart battery 101 relative to the total capacity of the smart battery 101 in the saturated charge condition is, but not limited to, between 30% and 50%, the embedded controller 107 will output a respective low level signal through the leads G1 and G2 of the general purpose input/output and simultaneously output a respective high level signal through the leads G3~G5 of the general purpose input/output. As a result, the LEDs 103a and 103b are lighted on and the other LEDs 103c~103e are lighted off. The light state of the LEDs 103a~103e denotes the remaining capacity of the smart battery 101 is less than the half of the total capacity of the smart battery 101 in the saturated charge condition.

If the percentage of the remaining capacity of the smart battery 101 relative to the total capacity of the smart battery 101 in the saturated charge condition is, but not limited to, between 50% and 70%, the embedded controller 107 will output a respective low level signal through the leads G1~G3 of the general purpose input/output and simultaneously output a respective high level signal through the leads G4~G5 of the general purpose input/output. As a result, the LEDs 103a~103c are lighted on and the other LEDs 103d~103e are lighted off. The light state of the LEDs 103a~103e denotes the remaining capacity of the smart battery 101 is more than the half of the total capacity of the smart battery 101 in the saturated charge condition.

If the percentage of the remaining capacity of the smart battery 101 relative to the total capacity of the smart battery 101 in the saturated charge condition is, but not limited to, between 70% and 90%, the embedded controller 107 will output a respective low level signal through the leads G1~G4 of the general purpose input/output and simultaneously output a high level signal through the lead G5 of the general purpose input/output. As a result, the LEDs 103a~103e are lighted on and the LED 103e is lighted off. The light state of the LEDs 103a~103e denotes the remaining capacity of the smart battery 101 is quite sufficient.

Additionally, if the percentage of the remaining capacity of the smart battery 101 relative to the total capacity of the smart battery 101 in the saturated charge condition is, but not limited to, between 90% and 100%, the embedded controller 107 will output a respective low level signal through the leads G1~G5 of the general purpose input/output. As a result, all the LEDs 103a~103e are lighted on. The light state of the LEDs 103a~103e denotes the remaining capacity of the smart battery 101 is full.

The LEDs 103a~103e can be lighted on/off for a predetermined time in one of the above conditions. After the predetermined time, the LEDs 103a~103e will restore their original respective indicator functions. In addition, when the function key 105a/105b is pressed again, the LEDs 103a~103e can also restore their original respective indicator functions. For example, in the present embodiment, the LEDs 103a~103e can restore their original indicator functions as the power supply indicator light, the network indicator light, the bluetooth indicator light, the hard drive indicator light and the USB port indicator light respectively. Therefore, the function of the LEDs 103a~103e displaying the remaining capacity of the smart battery 101 can not affect the original functions of the LEDs 103a~103e.

As mentioned above, the more LEDs of the LEDs 103a~103e are lighted on, the more remaining capacity of the smart battery 101 are. In contrast, the less LEDs of the LEDs 103a~103e are lighted on, the less remaining capacity of the smart battery 101 are. Therefore, the user can look into the number of the LEDs 103a~103e lighted on when the notebook computer 100 is situated either in a shutdown mode or in a power saving mode, thereby obtaining the information of remaining capacity of the smart battery 101.

Accordingly, the user can readily know the information of the remaining capacity of the smart battery 101 when the operating system of the notebook computer is situated either in a shutdown mode or in a power saving mode. It is not necessary for the operating system of the notebook computer to be situated in a normal operating mode. According to the information of the remaining capacity of the smart battery 101, the user of the notebook computer 100 can judge whether it is necessary for the smart battery 101 to be charged and decide whether the notebook computer 100 is carried outside to be used immediately.

In the present invention, the electronic components originally equipped in the notebook computer are used to display the information of the remaining capacity of the smart battery when the notebook computer is situated either in a shutdown mode or in a power saving mode. Therefore, it is not necessary for the notebook computer to be equipped with the extra hardware. Thus, the cost can not be increased because of increase of the function of displaying information of the remaining capacity of the smart battery. In detail, the user can press the function key (i.e., either the power supply function key or one of the left and right keys of the touch pad) firstly when the notebook computer is situated either in a shutdown mode or in a power saving mode. Then, the embedded controller reads the data of the remaining capacity of the smart battery through the SMBus, thereby analyzing the remaining capacity of the smart battery.

Further, the embedded controller calculates the percentage of the remaining capacity of the smart battery relative to the total capacity of the smart battery in the saturated charge condition, thereby outputting different level signals through the leads G1~G5 of the general purpose input/output. As a result, the status indicator lights originally equipped in the notebook computer are controlled to be lighted on or light off. The light state of the status indicator lights is relative to the percentage of the remaining capacity of the smart battery. Therefore, the light state of the status indicator lights can denote the information of the remaining capacity of the smart battery when the notebook computer is situated either in a shutdown mode or in a power saving mode.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A notebook computer, comprising:
a main body;
a display module disposed on the main body;
a smart battery;
a plurality of status indicator lights, disposed on the main body individually, wherein the status indicator lights comprises a power supply indicator light, a network indicator light, a bluetooth indicator light, a hard drive indicator light and a USB port indicator light;
a function key, disposed on the main body; and
an embedded controller electrically coupled to the smart battery, the status indicator lights and the function key, the embedded controller being configured for reading data of remaining capacity of the smart battery through a bus between the smart battery and the embedded controller in the condition that the display module is in a power-off state, the notebook computer is situated either in a shutdown mode or in a power saving mode and the function key is pressed so as to calculate the remaining capacity of the smart battery, thereby controlling the plurality of status indicator lights to be light on/off to display information of the remaining capacity of the smart battery,
wherein the remaining capacity of the smart battery is proportional to a number of the status indicator lights lighted on, and the remaining capacity of the smart battery is full, all of the status indicator lights are lighted on;
after the status indicator lights lighting on/off for a predetermined time or the function key is pressed again, the status indicator lights restore their original respective indicator functions as the power supply indicator light, the network indicator light, the bluetooth indicator light, the hard drive indicator light and the USB port indicator light respectively.

2. The notebook computer as claimed in claim 1, wherein the smart battery comprises a gas gauge IC for providing the data of the remaining capacity of the smart battery.

3. The notebook computer as claimed in claim 1, wherein the plurality of status indicator lights are LEDs, an anode of each of the LEDs is electrically coupled to a system voltage, and a cathode of each of the LEDs is electrically coupled to a corresponding lead of a general purpose input/output of the embedded controller.

4. The notebook computer as claimed in claim 1, wherein the bus is a system management bus.

5. The notebook computer as claimed in claim 1, wherein the function key is a power supply function key.

6. The notebook computer as claimed in claim 1, wherein the function key is a left key of a touch pad.

7. The notebook computer as claimed in claim 1, wherein the function key is a right key of a touch pad.

8. A notebook computer, comprising:
a main body;
a display module disposed on the main body;
a smart battery;
a plurality of status indicator lights, disposed on the main body individually, wherein the status indicator lights comprises a power supply indicator light, a network indicator light, a bluetooth indicator light, a hard drive indicator light and a USB port indicator light, the light state of the plurality of status indicator lights denoting information of remaining capacity of the smart battery in the condition that the display module is in a power-off state, the notebook computer is situated either in a power saving mode or in a shutdown mode, wherein the remaining capacity of the smart battery is proportional to a number of the status indicator lights lighted on, and the remaining capacity of the smart battery is full, all of the status indicator lights are lighted on;
a function key, disposed on the main body; and
an embedded controller electrically coupled to the smart battery, the plurality of status indicator lights and the function key, the embedded controller being capable of being triggered by pressing the function key and analyzing the remaining capacity of the smart battery, thereby controlling the light state of the plurality of status indicator lights;
after the status indicator lights lighting on/off for a predetermined time or the function key is pressed again, the status indicator lights restore their original respective indicator functions as the power supply indicator light, the network indicator light, the bluetooth indicator light, the hard drive indicator light and the USB port indicator light respectively.

9. The notebook computer as claimed in claim 8, wherein the smart battery comprises a gas gauge IC for providing the data of the remaining capacity of the smart battery.

10. The notebook computer as claimed in claim 8, wherein the plurality of status indicator lights are LEDs, an anode of each of the LEDs is electrically coupled to a system voltage, and a cathode of each of the LEDs is electrically coupled to a corresponding lead of a general purpose input/output of the embedded controller.

11. The notebook computer as claimed in claim 8, further comprising a bus for communicates the embedded controller with the smart battery.

12. The notebook computer as claimed in claim 11, wherein the bus is a system management bus.

13. The notebook computer as claimed in claim 8, wherein the function key is a power supply function key.

14. The notebook computer as claimed in claim 8, wherein the function key is a left key of a touch pad.

15. The notebook computer as claimed in claim 8, wherein the function key is a right key of a touch pad.

\* \* \* \* \*